United States Patent
Khatri et al.

(10) Patent No.: US 10,831,897 B2
(45) Date of Patent: Nov. 10, 2020

(54) SELECTIVE ENFORCEMENT OF SECURE BOOT DATABASE ENTRIES IN AN INFORMATION HANDLING SYSTEM

(71) Applicant: DELL PRODUCTS, L.P., Round Rock, TX (US)

(72) Inventors: Mukund P. Khatri, Austin, TX (US); William C. Munger, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 219 days.

(21) Appl. No.: 15/650,795

(22) Filed: Jul. 14, 2017

(65) Prior Publication Data

US 2019/0018966 A1    Jan. 17, 2019

(51) Int. Cl.
 *G06F 21/57* (2013.01)
 *H04L 9/32* (2006.01)

(52) U.S. Cl.
 CPC .......... *G06F 21/575* (2013.01); *H04L 9/3247* (2013.01); *H04L 9/3263* (2013.01); *H04L 2209/68* (2013.01)

(58) Field of Classification Search
 CPC . H04L 9/3247; H04L 9/3263; H04L 2209/68; G06F 21/575
 USPC .......................................................... 726/22
 See application file for complete search history.

(56) References Cited

U.S. PATENT DOCUMENTS

| | | | |
|---|---|---|---|
| 8,312,509 B2 * | 11/2012 | Zimmer | G06F 21/53 726/2 |
| 8,484,474 B2 | 7/2013 | Batke et al. | |
| 9,147,075 B1 * | 9/2015 | Litvin | G06F 21/575 |
| 9,189,631 B2 * | 11/2015 | Liu | G06F 21/572 |
| 9,250,919 B1 * | 2/2016 | Narey | G06F 9/441 |
| 9,507,581 B2 | 11/2016 | Butcher et al. | |
| 9,524,390 B2 | 12/2016 | Kulkarni et al. | |
| 9,626,166 B1 * | 4/2017 | Alewine | H04L 63/083 |
| 9,930,051 B1 * | 3/2018 | Potlapally | H04L 63/126 |
| 2008/0244257 A1 * | 10/2008 | Vaid | H04L 9/0827 713/2 |
| 2010/0083002 A1 * | 4/2010 | Cui | G06F 21/575 713/189 |
| 2010/0169633 A1 * | 7/2010 | Zimmer | G06F 21/575 713/2 |
| 2013/0191622 A1 * | 7/2013 | Sasaki | G06F 9/4401 713/2 |

(Continued)

*Primary Examiner* — Shahriar Zarrineh
(74) *Attorney, Agent, or Firm* — Isidore PLLC

(57) ABSTRACT

A method and an information handling system (IHS) for authenticating unified extensible firmware interface (UEFI) images in an IHS. The method includes receiving, by a processor of the IHS, a request to authenticate an image. The method also includes determining a type of the image and retrieving, from an entry within a UEFI signature database, a certificate utilized to sign the image. The method further includes determining a verification entry of a verification database of the HIS that corresponds to the entry of the UEFI signature database and identifying, from the verification entry, a particular type of image which the certificate may be used to authenticate. The method further includes determining whether the type of the image is the particular type. In response to determining the type of the image is the particular type, the method includes authenticating the image using the certificate.

20 Claims, 6 Drawing Sheets

(56) References Cited

U.S. PATENT DOCUMENTS

| | | | | |
|---|---|---|---|---|
| 2014/0149730 A1* | 5/2014 | Joshi | ............... | G06F 21/572 713/2 |
| 2014/0331064 A1* | 11/2014 | Ballesteros | ......... | G06F 12/1408 713/193 |
| 2014/0351571 A1* | 11/2014 | Jacobs | ............... | G06F 21/575 713/2 |
| 2015/0074387 A1* | 3/2015 | Lewis | ............... | G06F 21/575 713/2 |
| 2015/0089209 A1* | 3/2015 | Jacobs | ............... | G06F 21/575 713/1 |
| 2015/0193620 A1* | 7/2015 | Khatri | ............... | G06F 21/575 713/2 |
| 2015/0199517 A1* | 7/2015 | Rose | ............... | G06F 21/57 726/22 |
| 2015/0235029 A1* | 8/2015 | Morishige | ............ | G06F 21/572 713/1 |
| 2015/0271297 A1* | 9/2015 | Zimmer | ............ | G06F 9/4416 709/203 |
| 2015/0378846 A1* | 12/2015 | Hagiwara | ............ | G06F 21/572 714/19 |
| 2015/0379306 A1 | 12/2015 | Zimmer et al. | | |
| 2016/0070913 A1* | 3/2016 | Kulkarni | ............ | G06F 21/575 713/2 |
| 2016/0180094 A1* | 6/2016 | Dasar | ............... | G06F 21/575 714/36 |
| 2016/0182238 A1* | 6/2016 | Dewan | ............... | H04L 9/3263 713/171 |
| 2016/0275291 A1* | 9/2016 | Campbell | ............ | G06F 16/252 |
| 2016/0282927 A1* | 9/2016 | Adams | ............... | G06F 9/4418 |
| 2016/0378970 A1* | 12/2016 | Campbell | ............ | G06F 21/575 726/17 |
| 2016/0378990 A1 | 12/2016 | Goodman et al. | | |
| 2017/0109235 A1* | 4/2017 | Hung | ............... | G06F 11/1435 |
| 2017/0109531 A1* | 4/2017 | Wang | ............... | G06F 21/572 |
| 2017/0154184 A1* | 6/2017 | Shivanna | ............ | G06F 8/654 |
| 2017/0168851 A1* | 6/2017 | Lin | ............... | G06F 8/654 |
| 2017/0220802 A1* | 8/2017 | Huang | ............... | G06F 21/575 |
| 2017/0230185 A1* | 8/2017 | Varadhan | ............ | H04L 9/14 |
| 2017/0270301 A1* | 9/2017 | Vidyadhara | ......... | G06F 21/575 |
| 2017/0357522 A1* | 12/2017 | Bower, III | ............ | H04L 9/3247 |
| 2017/0372074 A1* | 12/2017 | Gunti | ............... | H04L 9/3247 |
| 2018/0026835 A1* | 1/2018 | Nachimuthu | ......... | H04L 47/38 717/172 |
| 2018/0032734 A1* | 2/2018 | Gunti | ............... | G06F 21/575 |
| 2018/0091315 A1* | 3/2018 | Singhal | ............... | G06F 21/57 |
| 2018/0136946 A1* | 5/2018 | El-Haj-Mahmoud | ......... | G06F 9/4416 |
| 2018/0314828 A1* | 11/2018 | Harrison | ............ | G06F 9/4401 |
| 2018/0365424 A1* | 12/2018 | Callaghan | ............ | G06F 21/575 |

* cited by examiner

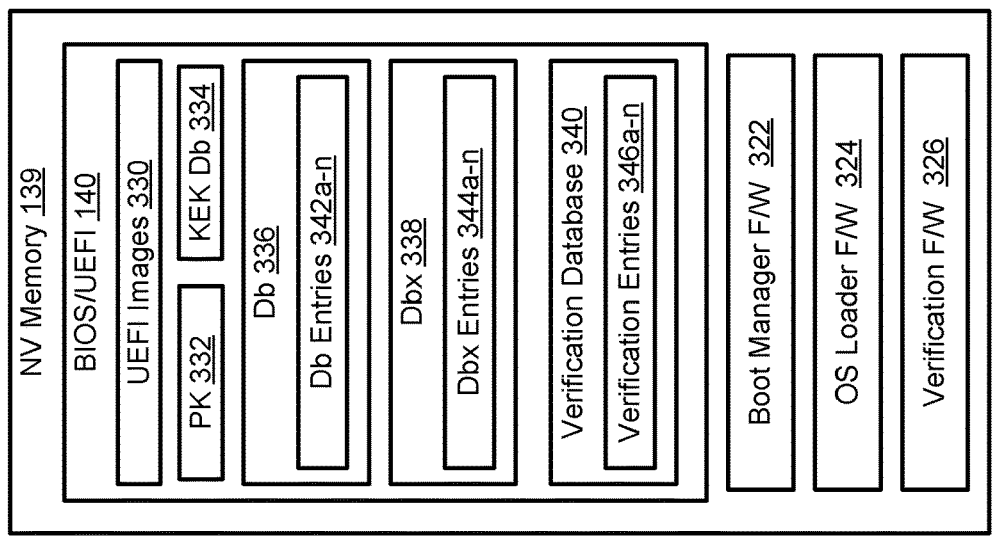
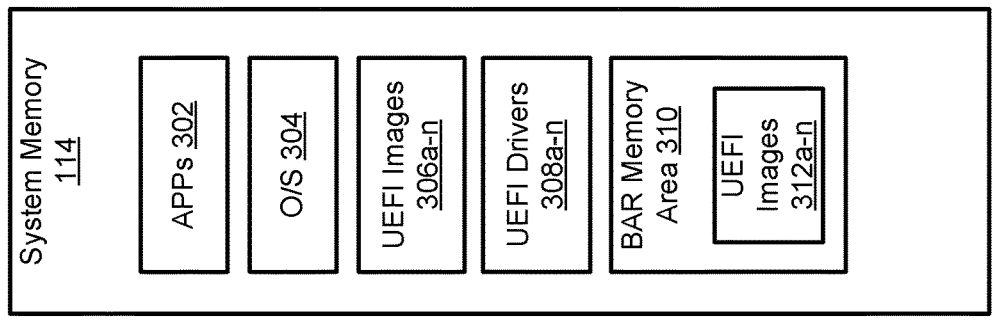
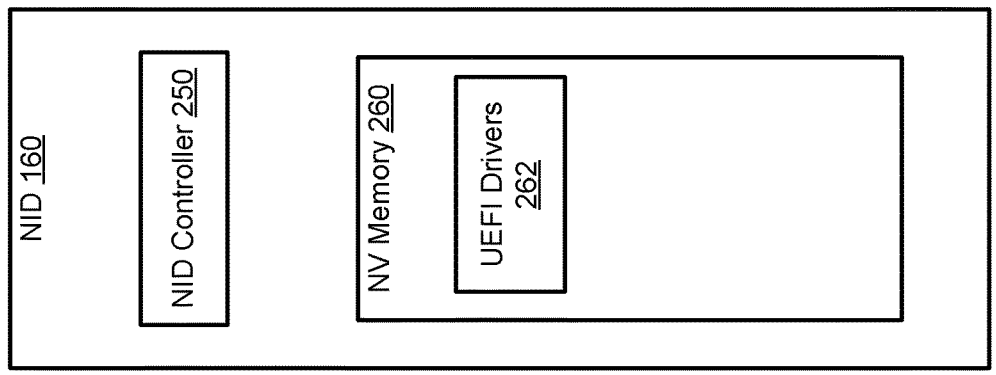
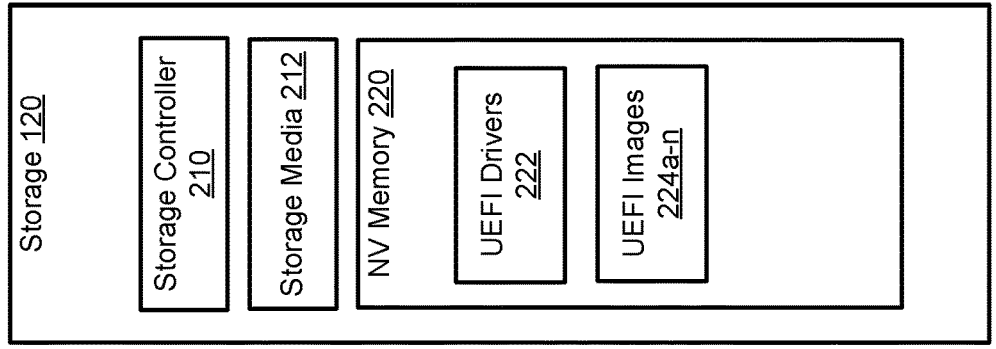
FIG. 3B
FIG. 3A
FIG. 2B
FIG. 2A

SELECTIVE ENFORCEMENT OF SECURE BOOT DATABASE ENTRIES IN AN INFORMATION HANDLING SYSTEM

BACKGROUND

1. Technical Field

The present disclosure generally relates to information handling systems and in particular to validating secure boot entries in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional information handling systems (IHSs) are configured with firmware required to test/confirm the hardware devices and associated images and to initiate the operating system (OS) during system boot-up. Unified extensible firmware interface (UEFI) is a specification that defines a software interface between an operating system and platform firmware. UEFI replaces the basic input/output system (BIOS) found on older information handling systems. UEFI provides a standard architecture and data structure to manage initialization and configuration of devices, booting of platform resources, and passing of control to the operating system.

The UEFI specification allows for the extension of platform firmware by loading UEFI driver and application images. The UEFI specifications define four public key databases. Those databases include: (1) an authorization signature database (Db) that contains certificates that authorize particular images for execution, (2) a forbidden signature database (Dbx) that contains certificates that forbid particular images from executing, (3) a key exchange key (KEK) database that contains keys used to update Db and Dbx, and (4) a platform key (PK) database that authorizes writes/updates to the KEK. The UEFI specification provides that any pre-boot image may be authorized by any entry in Db or forbidden by any certificate in Dbx. Thus, an industry-wide certificate may authorize a pre-boot image, even if a customer establishes customized certificates that are preferred over the selection of the industry-wide certificate.

BRIEF SUMMARY

Disclosed are a method and an information handling system (IHS) for authenticating unified extensible firmware interface (UEFI) images in an IHS.

According to one embodiment, the method includes receiving, by a processor of the IHS, a request to authenticate an image. The method also includes determining a type of the image and retrieving, from an entry within a UEFI signature database, a certificate utilized to sign the image. The method further includes determining a verification entry of a verification database of the IHS that corresponds to the entry of the UEFI signature database, and identifying, from the verification entry, a particular type of image which the certificate may be used to authenticate. The method further includes determining whether the type of the image is the particular type. In response to determining the type of the image is the particular type, the image is authenticated using the certificate.

According to another embodiment, the IHS includes a UEFI signature database having a plurality of entries, each entry having a certificate used to sign at least one corresponding image from among a plurality of images. The IHS also includes a verification database having a plurality of verification entries corresponding to the plurality of entries in the UEFI signature database. Each verification entry in the verification database (1) is associated with a particular certificate in the UEFI signature database and (2) identifies, from among a plurality of image types, a type of image for which the particular certificate may be used to authenticate. The IHS also includes at least one processor and a bootloader that identifies an image from among the plurality of images for authentication. The at least one processor determines a type of the image and retrieves, from an entry within the UEFI signature database, a certificate utilized to sign the image. The processor further determines a verification entry of a verification database that corresponds to the entry of the UEFI signature database, and the processor identifies, from the verification entry, a particular type of image which the certificate may be used to authenticate. The processor then determines whether the type of the image is the particular type. In response to determining the type of the image is the particular type, the processor authenticates the image using the certificate.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 2A illustrates example components within an example storage device, in accordance with one embodiment;

FIG. 2B illustrates example components within an example network interface device, in accordance with one embodiment;

FIG. 3A illustrates example contents of a system memory in an IHS, in accordance with one embodiment;

FIG. 3B illustrates example contents of a non-volatile storage device, in accordance with one embodiment;

DETAILED DESCRIPTION

Figure 1:
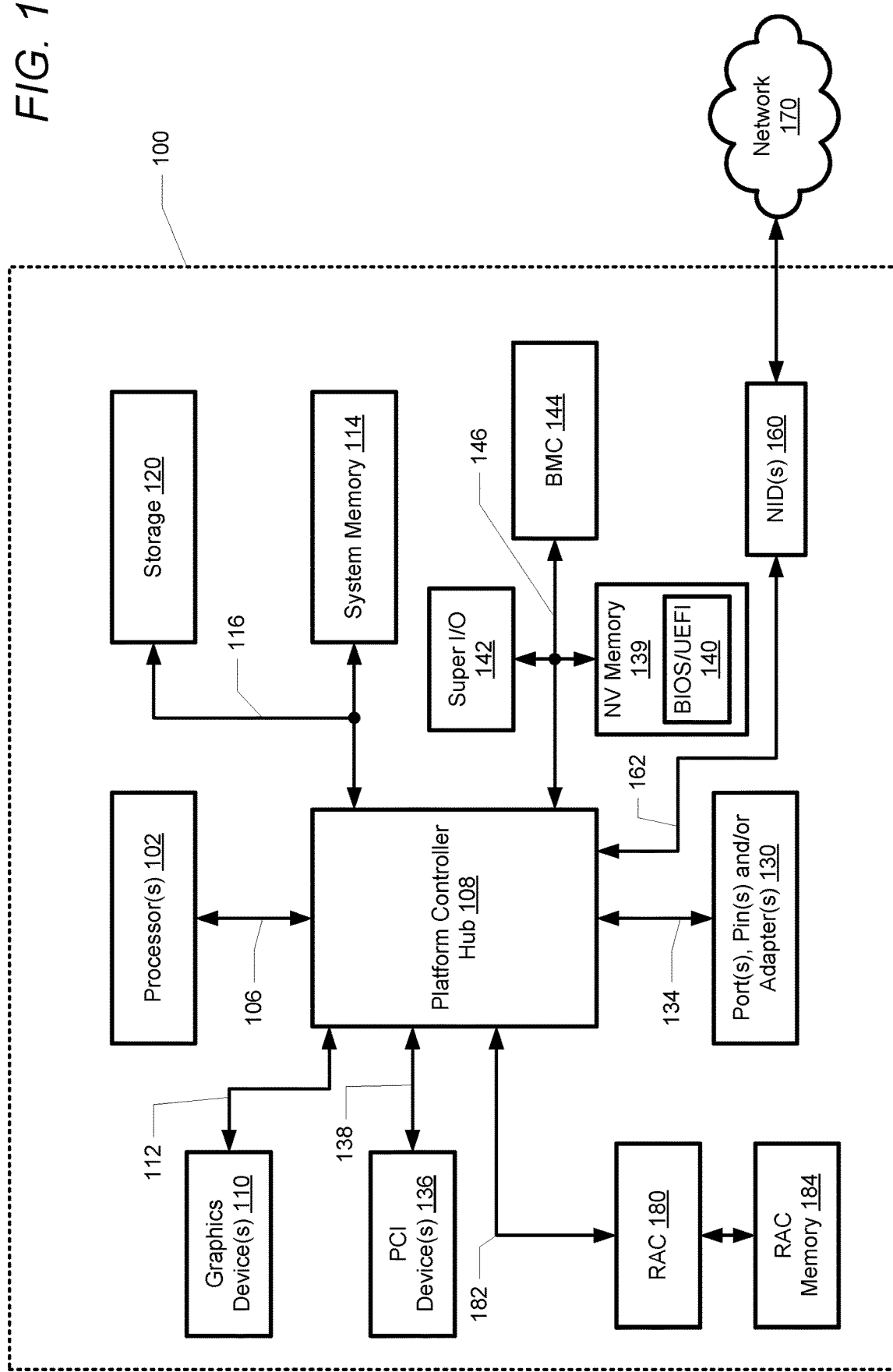
FIG. 1 illustrates one example of an IHS within which various aspects of the disclosure can be implemented, according to one or more embodiments.

The illustrative embodiments provide a method and an information handling system (IHS) for authenticating unified extensible firmware interface (UEFI) images in an IHS.

The method includes receiving, by a processor of the IHS, a request to authenticate an image. The method also includes determining a type of the image and retrieving, from an entry within a UEFI signature database, a certificate utilized to sign the image. The method further includes determining a verification entry of a verification database of the IHS that corresponds to the entry of the UEFI signature database, and identifying, from the verification entry, a particular type of image which the certificate may be used to authenticate. The method further includes determining whether the type of the image is the particular type. In response to determining the type of the image is the particular type, the image is authenticated using the certificate.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 is coupled to a chipset or platform controller hub (PCH) 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via system bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over input/output (I/O) bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over I/O bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in association with IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

In another embodiment, LPC bus 146 can be a peripheral component interconnect express (PCIe) bus that utilizes a management component transport protocol (MCTP). MCTP is a bus protocol that supports communications between different intelligent hardware components that make up a platform management subsystem. MCTP further provides monitoring and control functions. The MCTP protocol is independent of the underlying physical bus properties, as well as the data link layer messaging used on the bus. The MCTP communication model includes a message format, transport description, message exchange patterns, and operational endpoint characteristics. PCIe MCTP allows BMC 144 to communicate with various components or devices of IHS 100 such as graphics devices 110, storage 120, PCI devices 136 and NID(s) 160.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a board management controller (BMC) 144 that is in communication with NV memory 139, which can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally, or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse, and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via PCI bus 182 to PCH 108. RAC 180 provides management functions that allow an administrator to remotely deploy, monitor, manage, configure, update, troubleshoot, and remediate IHS 100. RAC 180 is also coupled to RAC memory 184. In one embodiment, RAC memory 184 can be shared with processor(s) 102.

RAC 180 monitors and controls the operation of IHS 100 and other systems and devices communicatively coupled to IHS 100. RAC 180 can also perform configuration and remote control of other connected IHS s. Certain software and/or firmware modules stored in RAC memory 184 can be executed by RAC 180. Processor(s) 102 and RAC 180 include specific firmware that enables processor(s) 102 and RAC 180 to perform the various functions described herein.

In an embodiment, a motherboard (not specifically shown) is provided that is configured to provide structural support, power, and electrical connectivity between the various aforementioned components. Such a motherboard may include multiple connector sockets in various configurations, adapted to receive pluggable circuit cards, component chip packages, etc.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

In the description of the following figures, reference is also occasionally made to specific components illustrated within the preceding figures, utilizing the same reference numbers from the earlier figures. With reference now to FIG. 2A, one embodiment of storage 120 of IHS 100 is shown. Storage 120 includes storage controller 210, storage media 212, and non-volatile (NV) memory 220. Storage controller 210 can manage and control the operation of storage 120. Storage media 212 can include hard drives or solid-state drives. NV memory 220 is a data storage device that retains its stored data even when electrical power is removed. As illustrated, NV memory 220 can contain one or more UEFI device drivers 222 that are associated with storage 120 and/or one or more UEFI images 224*a-n*. UEFI drivers 222 can be loaded into system memory 114 during start-up or booting of IHS 100 in order to facilitate the operation of storage 120 within IHS 100. UEFI images 224*a-n* facilitate communications and operation of components of IHS 100. In one or more embodiments, UEFI images 224*a-n* may be associated with a particular operating system and/or the operation of particular components.

FIG. 2B illustrates one embodiment of NID 160. NID 160 includes NID controller 250 and NV memory 260. NID controller 250 can manage and control the operation of NID 160. NV memory 260 can contain one or more UEFI drivers 262 that can be used to enable the initialization and operation of NID 160 on IHS 100. UEFI drivers 262 can be loaded into system memory 114 during start-up or booting of IHS 100 in order to facilitate the operation of NID 160 within IHS 100.

With reference now to FIG. 3A, there is shown one embodiment of example contents of system memory 114 of IHS 100. System memory 114 includes data, software, and/or firmware modules, including application(s) 302, operating system (OS) 304, UEFI images 306*a-n*, and UEFI drivers 308*a-n*. System memory 114 can also include other data, software, and/or firmware modules. UEFI images 306*a-n* and UEFI drivers 308*a-n* are program modules executable by processor 102 that are loaded during booting of OS 304 onto IHS 100 to facilitate communications and operation of specific devices and/or hardware components of IHS 100. System memory 114 can also include a base address register (BAR) memory area 310 that is addressed via a base address register. System memory 114 also includes UEFI images 312*a-n* executable by processor 102 that are loaded during start-up or booting of IHS 100 to facilitate communications and operation of other devices and/or hardware components of IHS 100. In one or more embodiments, UEFI images 312*a-n* may include UEFI drivers.

Turning to FIG. 3B, one embodiment of example contents of NV memory 139 of IHS 100 is shown. NV memory 139 includes BIOS/UEFI 140. BIOS/UEFI 140 can include UEFI images 330, platform key (PK) 332, key exchange key (KEK) database (KEK Db 334), authorization signature database (Db) 336, forbidden signatures database (Dbx) 338, and verification database(s) 340. UEFI images 330 can be loaded during system start-up or booting by IHS 100. PK 332 is a key that is written to the firmware during boot of IHS 100. Once PK 332 is written, secure boot enters "User" mode, where only drivers and loaders signed with an authorized key can be loaded by the firmware. KEK Db 334 contains at least one KEK that is used to authorize writes to Db 336 and Dbx 338. The KEK may only be updated using a certificate signed with PK 332. Db 336 contains a plurality of entries (Db entries 342*a-n*). Each of Db entries 342*a-n* contains a certificate that authorizes a particular UEFI image or UEFI driver to execute. Dbx 338 contains a plurality of entries (Dbx entries 344*a-n*). Each of Dbx entries 344*a-n* contains a certificate that forbids a particular UEFI image or UEFI driver from executing. Verification database contains a plurality of verification entries 346*a-n*. Each of verification entries 346*a-n* is associated with a corresponding entry within Db 336 or Dbx 338 and identifies a type of image for which a certificate in the corresponding entry of Db 336 or Dbx 338 may be used to authenticate. The image types may include, but are not limited to, a device firmware type and boot image type. For example, verification entry 346*b* corresponds to a second entry (e.g., Db entry 342*b*) of Db 336 and specifies, that the certificate stored within Db entry 342*b* may only be used to authenticate UEFI images of a device firmware type.

NV memory 139 further includes boot manager firmware (F/W) 322, OS loader F/W 324, and verification F/W 326. Boot manager 322 operates during the driver execution phase (DXE) of booting and facilitates the loading of UEFI images and drivers 306a-n. OS loader F/W 324 operates during the transient system load phase of booting and facilitates the loading of OS 304. Verification F/W 326 operates during DXE to facilitate the verification of UEFI images, bootloaders, and/or drivers prior to loading/booting. Verification F/W 326 performs the processes presented in the flowcharts of FIGS. 6 and 7.

Figure 4:
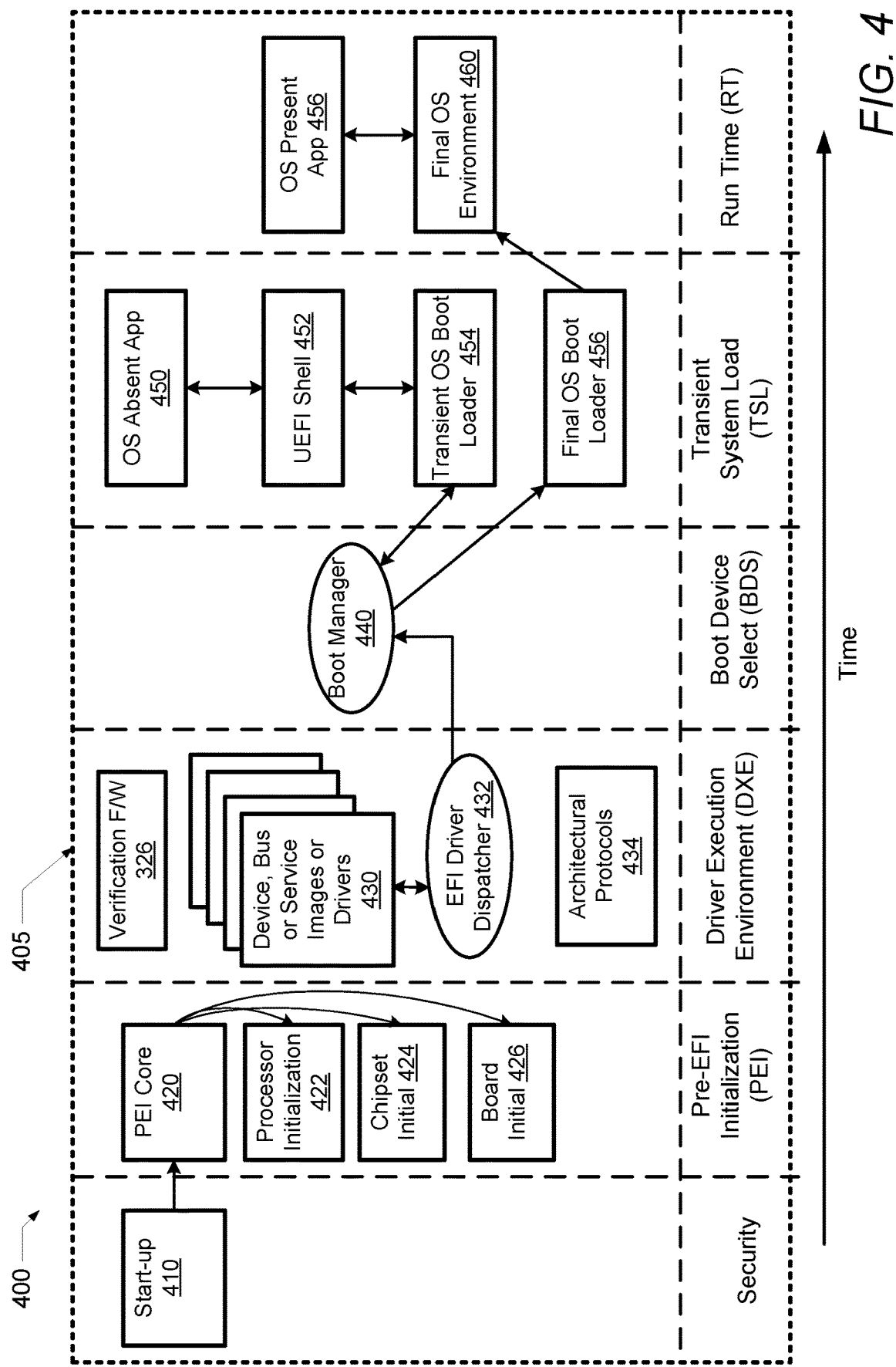
FIG. 4 illustrates a timeline of a boot-up operation for an IHS, in accordance with one embodiment.

FIG. 4 illustrates a timeline 400 of a boot operation (or boot process) 405 for IHS 100, which includes a security phase, pre-EFI initialization (PEI) phase, driver execution environment (DXE) phase, boot device select (BDS) phase, transient system load (TSL) phase, and a run time (RT) phase. Timeline 400 begins at start-up 410, which involves a security phase, where processor 102 is started. At PEI phase, a PEI core operation 420 is performed. During the PEI core operation 420, memory is initialized and firmware volume locations are described in hand off blocks. Next, a processor initialization 422 of processor 102 occurs, followed by chipset initialization 424 and then motherboard initialization 426. At the DXE phase, EFI driver dispatcher 432 retrieves device, bus or service images or drivers 430, depending upon the architectural protocols 434 associated with IHS 100. During the DXE phase, if a secure boot process or mode is enabled, an authentication check of UEFI images 430 occurs. If the secure boot process or mode is not enabled, an authentication check of UEFI images 430 does not occur during the DXE phase. The secure boot process or policy prevents the loading of drivers or images that are not signed with an acceptable digital signature. When secure boot is enabled, IHS 100 is initially placed in "setup" mode, which allows a public key (e.g., the PK 332) to be written to the firmware. Once the key is written, secure boot enters "User" mode, where only drivers and loaders signed with an authorized key can be loaded by the firmware. One or more of the described embodiments occurs during the DXE phase.

In one embodiment, verification F/W 326 executes on processor 102 during the DXE phase. In another embodiment, verification F/W 326 may execute on BMC 144 during the DXE phase. During the DXE phase, BMC 144 identifies a request to authenticate a particular UEFI image from among a plurality of UEFI images. BMC 144 identifies the type of the UEFI image based on the storage location of the UEFI image. For example, BMC 144 identifies (1) UEFI images stored within a filesystem as having the boot image type and (2) UEFI images accessed via base address register memory space via a base address register as having a device firmware type. It should be noted that these image types are provided for example purposes only and other image types may be included. It should also be noted that a filesystem may include a local filesystem within a local storage (e.g., non-volatile memory 139, storage 120, and/or storage media 212) of IHS 100 and/or a remote filesystem, such a filesystem of a server that is connected to a same network (e.g., network 170) as IHS 100. In another embodiment, BMC 144 may determine the type of the UEFI image by reading metadata associated with the UEFI image. In response to determining the type of the image, BMC 144 retrieves, from an entry within a UEFI signature database (Db 336 or Dbx 338), a certificate utilized to sign the UEFI image. BMC 144 then determines a verification entry (e.g., verification entry 346b) within a corresponding verification database (e.g., verification Db 340) and identifies, from the verification entry, a particular type of image that the certificate may be used to authenticate. BMC 144 determines whether the type of the UEFI image matches the particular type identified within the verification entry. In response to determining the type of the UEFI image matches the particular type, the UEFI image is authenticated using the certificate. If the UEFI image is authenticated using a certificate from an authorization signature database (Db 336) the UEFI image is permitted to execute on IHS 100. If the UEFI image is authenticated using a certificate from a forbidden signatures database (Dbx 338) the UEFI image is forbidden from executing on IHS 100. If the type of the UEFI image does not match the particular type, BMC 144 sequentially checks each entry in the UEFI signature database for a subsequent certificate that was used to sign the image. In response to determining no other certificates in the UEFI signature database were used to sign the image, BMC 144 issues a notification, such as an error message that indicates that the UEFI image was not able to be authenticated, to an error log and/or at least one output device (e.g., a monitor). In one embodiment, the detected failure may also be recorded to memory (e.g., NV Memory 139) for future reference/access.

In another embodiment, verification entries 346a-n may also specify a particular device that a corresponding certificate may be used to authenticate. For example, verification entry 346b may specify both (i) a device firmware type and (ii) a particular NID (e.g., NID 160) that a corresponding certificate in the UEFI signature database may be used to authenticate. In the provided example, this certificate in the UEFI signature database can only be used to validate NID 160 and could not be used to validate other NIDs. While the above example refers to a NID as the device, in other embodiments other types of devices, such as storage controllers and graphics devices, can be specified within a verification entry. Any devices identified in verification entries 346a-n may be identified by any unique identifier, including, but not limited to: a serial number, PCIe vendor ID and PCIe device ID, and/or media access control (MAC) address.

EFI driver dispatcher 432 transmits device, bus or service images or drivers 430 to boot manager 440 during the BDS phase. At the TSL phase, either transient OS boot loader 454 or final OS boot loader 456 loads device, bus or service images or drivers 430 to start OS 304. If transient OS boot loader 454 is selected to run, then IHS 100 enters a UEFI shell environment 452 and triggers OS absent application 450 to run. If final OS boot loader 456 is selected to run, IHS 100 loads OS 304, enters the final OS environment 460, and triggers OS present application 456 to run during the run time phase.

Figure 5:
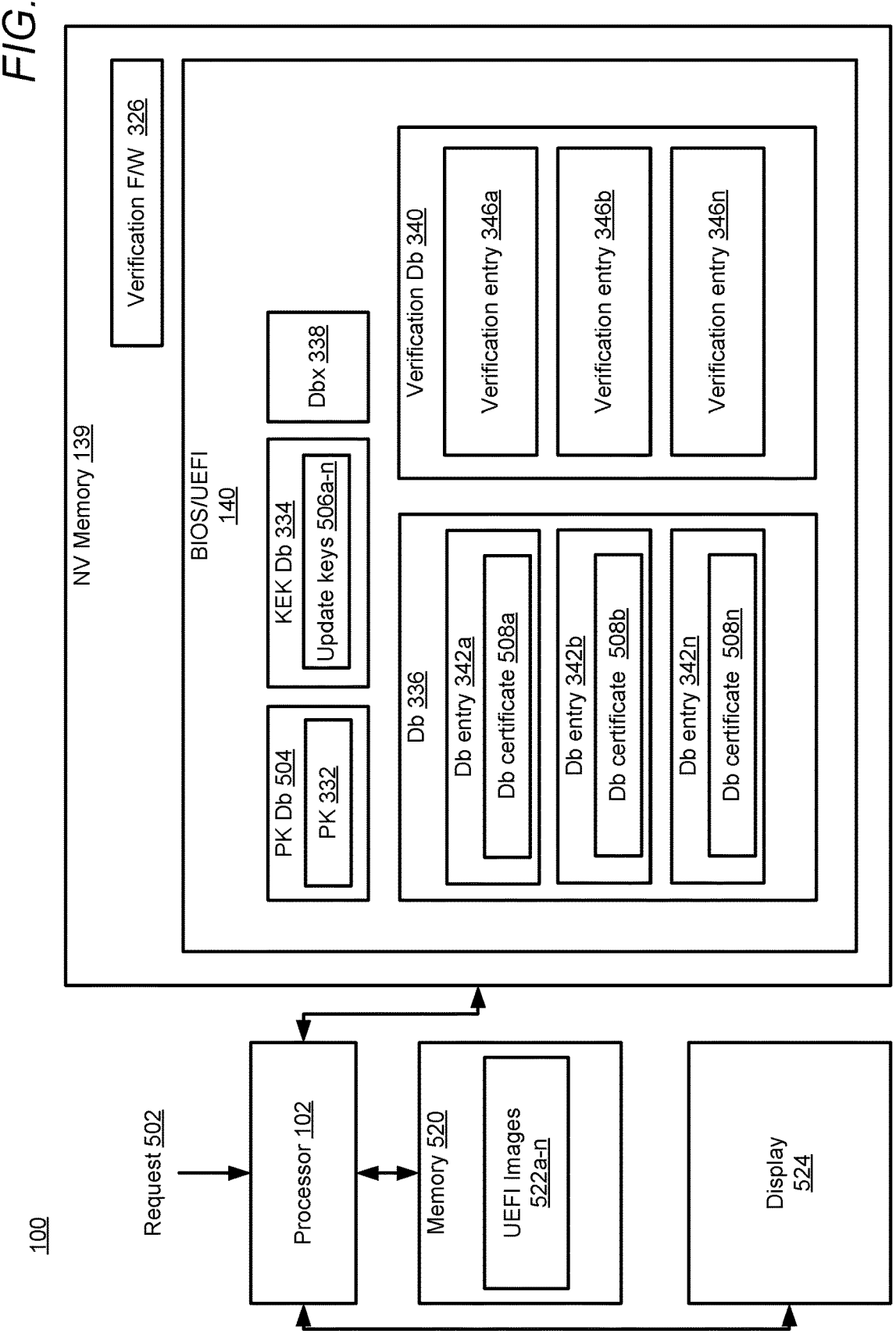
FIG. 5 illustrates an example non-volatile memory of an IHS for authenticating unified extensible firmware interface (UEFI) images, in accordance with one or more embodiments.

FIG. 5 illustrates an example of an IHS for authenticating unified extensible firmware interface (UEFI) images, in accordance with one or more embodiments. IHS 100 includes processor 102, memory 520, and NV Memory 139. Memory 520 may include system memory (e.g., system memory 114), storage (e.g., storage 120). UEFI images 522a-n are stored within memory 520 and can include, but are not limited to, device firmware images and boot images (including OS loaders). NV memory 139 includes verification F/W 326 and BIOS/UEFI 140. In one or more embodiments, memory 520 and NV memory 139 may be located in a same physical memory/storage.

BIOS/UEFI 140 includes KEK Db 334, Db 336, Dbx 338, verification Db 340, and PK Db 504. KEK Db 334 includes at least one KEK update key 506a-n that is used to authorize writes/updates to Db 336 and Dbx 338. Db 336 includes Db entries 342a-n, each of which includes a Db certificate 508a-n that authorizes a particular one of UEFI images to execute. Dbx 338 includes any number of Dbx entries, each of which includes a Dbx certificate that forbids a particular one of UEFI images to execute. PK Db 504 includes PK 332. Verification Db 340 corresponds to Db 336 and includes verification entries 346a-n. Each of verification entries 346a-n is associated with a corresponding one of Db entries 342a-n within Db 336. Each verification entry (e.g., verification entry 346a) identifies a type of image that a corresponding certificate in Db 336 may be used to authenticate. In the illustrated example, verification entry 346a identifies a type of image associated with Db certificate 508a, verification entry 346a identifies a type of image associated with Db certificate 508b, and so on.

Processor 102 receives request 502 to authenticate a UEFI image (e.g., UEFI image 522a). In one embodiment, request 502 is received from an input device (e.g., from a user via a keyboard). In another embodiment, request 502 is received from an image loader or boot loader, such as EFI driver dispatcher 432. In response to receiving request 502, verification F/W 326 identifies a type of UEFI image 522a by identifying the location where UEFI image 522a is stored. In one embodiment, UEFI image 522a is accessed using a base address register and is identified by verification F/W 326 as a device firmware type. In another embodiment, UEFI image 522a is accessed within a filesystem of IHS 100 and is identified by verification F/W 326 as a boot image type.

In response to determining the type of UEFI image 522a, verification F/W 326 sequentially checks, starting at first Db entry 508a, each entry of Db entries 508a-n in Db 336 until at least one Db certificate 508a-n is identified that was used to sign UEFI image 522a, or until no more entries exist in Db 336. If the sequential checking completes and a Db certificate cannot be found that was used to sign UEFI image 522a, verification F/W 326 generates a notification that indicates that UEFI image 522a was not able to be authenticated, and verification F/W 326 provides the notification to an error log and/or an output device, such as display 524. In one embodiment, if no UEFI images are able to be authenticated with certificates from Db 336, IHS 100 is left in a state where no image/operating system is booted.

In response to identifying a certificate (e.g., certificate 508b in Db entry 342b) from among Db certificates 508a-n that was used to sign UEFI image 522a, verification F/W 326 determines a corresponding verification entry (verification entry 346b) of verification Db 340. Verification F/W 326 determines whether an image type identified in verification entry 346b matches the identified image type of UEFI image 522a.

In response to determining the image type identified in verification entry 346b does not match the identified image type of UEFI image 522a, verification F/W 326 resumes the sequential checking of Db entries 508a-n until at least one Db certificate 508a-n is identified that was used to sign UEFI image 522a, or until no more entries exist in Db 336. In response to determining the image type identified in verification entry 346b matches the identified image type of UEFI image 522a, verification F/W 326 authenticates UEFI image 522a using Db certificate 508b. The authentication of Db certificate 508b authorizes UEFI image 522a to execute. Since verification entries 346a-n establish type limitations for Db certificates 508a-n, Db certificates 508a-n can be used to authorize specific boot options and/or device firmware.

In another embodiment, in response to identifying certificate 508b in Db entry 342b that was used to sign UEFI image 522a verification F/W 326 also determines: (i) a particular device identified in verification entry 346b and (ii) whether the particular device matches a particular device (e.g., NID 160) that is associated with UEFI image 522a. In response to determining the particular device identified in verification entry 346b does not match the device associated with UEFI image 522a, verification F/W 326 resumes the sequential checking of Db entries 508a-n. In response to determining (i) the image type identified in verification entry 346b matches the identified image type of UEFI image 522a and (ii) the particular device identified in verification entry 346b matches the device associated with UEFI image 522a, verification F/W 326 authenticates UEFI image 522a using Db certificate 508b.

In another embodiment, verification Db 340b is associated with Dbx 338 and each verification entry in verification Db 340b directly corresponds to a Dbx certificate in Dbx 338 and specifies a particular image type associated with that Dbx certificate in Dbx 338. In one or more embodiments, when a certificate in Dbx 338 (e.g. a third certificate) is authenticated in conjunction with a corresponding verification entry (e.g., the third verification entry) in the verification database, the corresponding UEFI image is forbidden from executing. In another embodiment, NV memory 139 includes a first verification database (verification Db 340) that contains verification entries corresponding to Db 336 and a second verification database that contains verification entries corresponding to Dbx 338.

Figure 6:
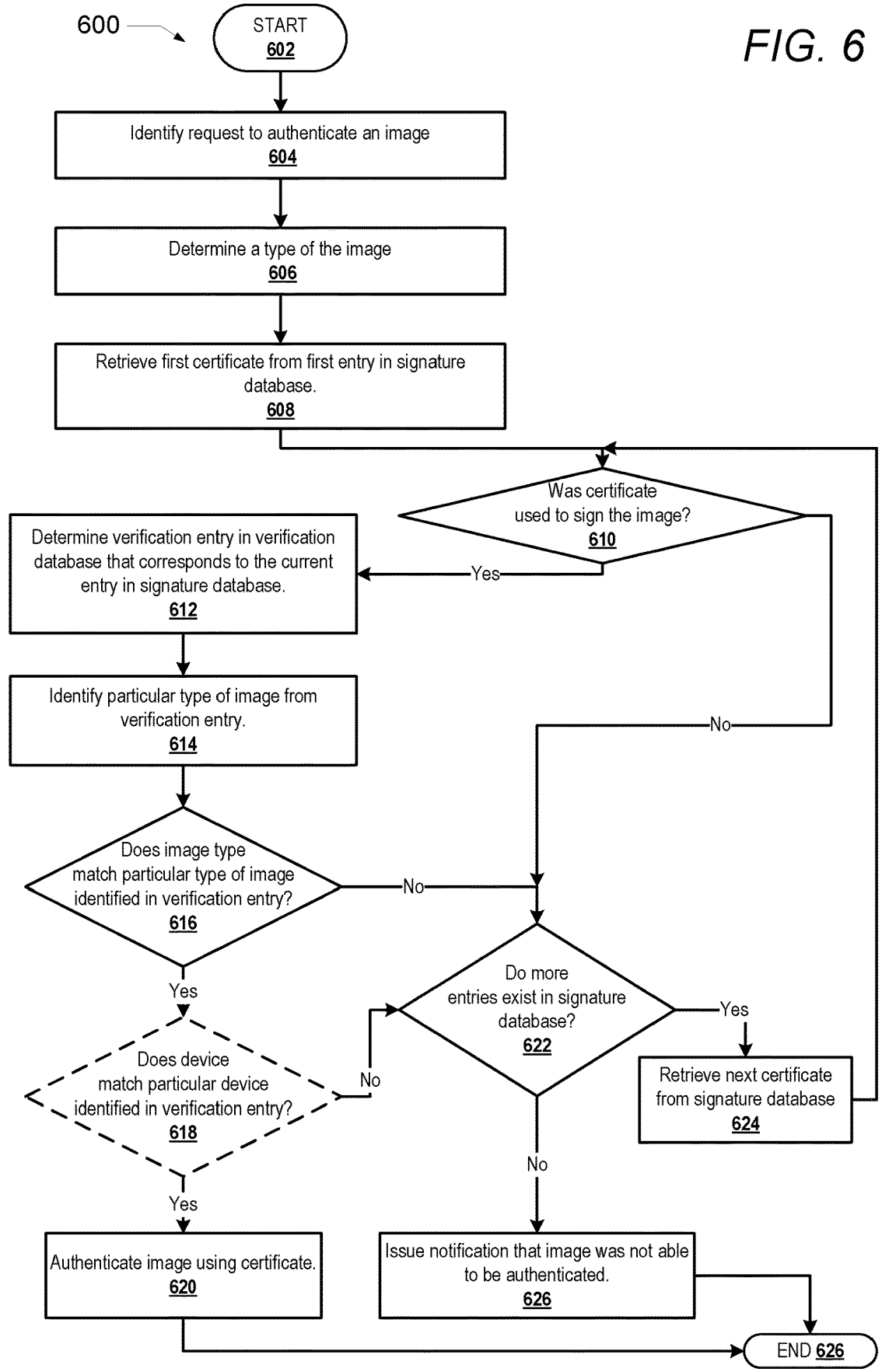
FIG. 6 is a flow chart illustrating one example of a method for authenticating UEFI images in an IHS, according to one or more embodiments.
Figure 7:
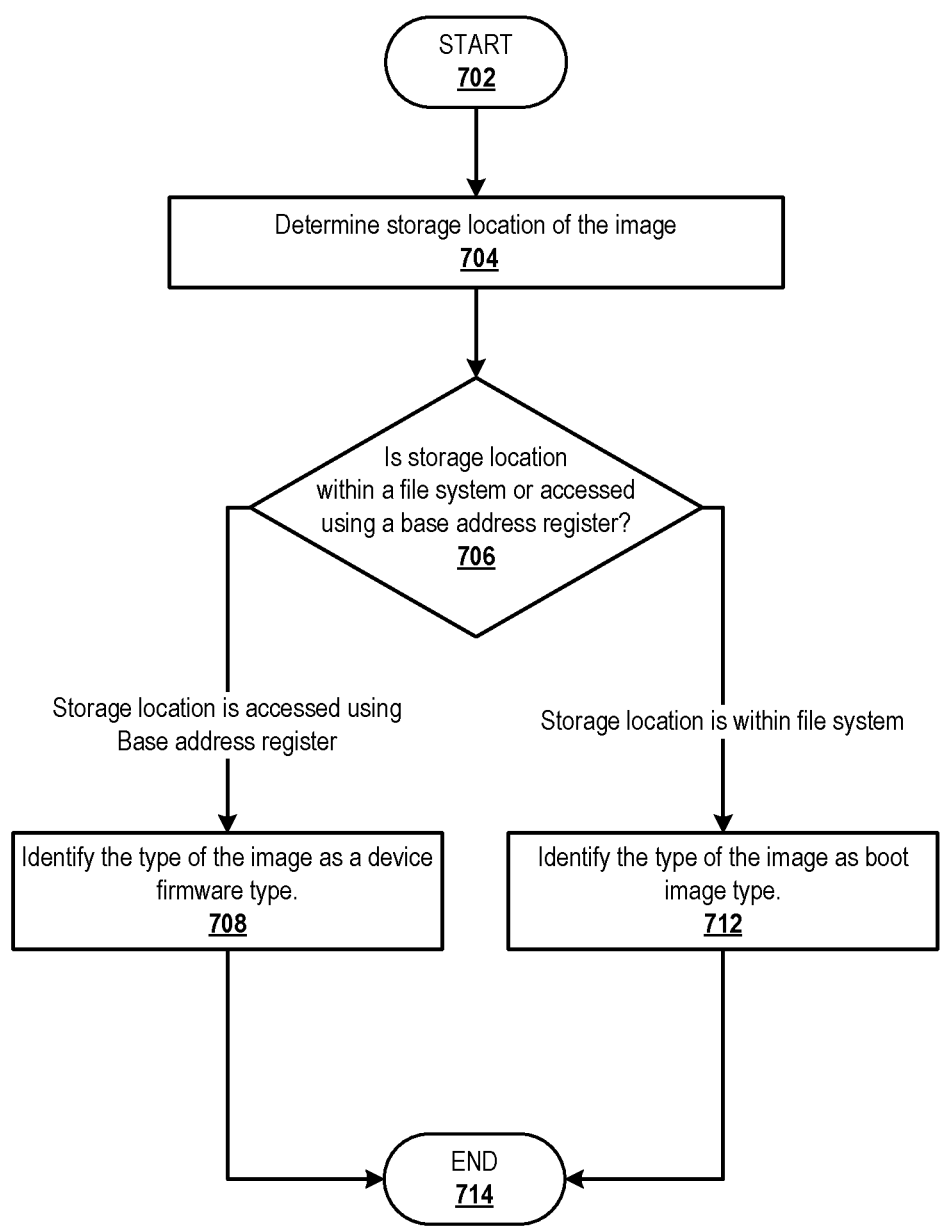
FIG. 7 is a flow chart illustrating one example of a method for identifying a type of a UEFI image in an IHS, according to one or more embodiments.

FIGS. 6 and 7 illustrate flowcharts of exemplary methods 600 and 700 by which processor 102 (or BMC 144) within the preceding figures performs different aspects of the processes that enable the one or more embodiments of the disclosure. Generally, method 600 represents a method for authenticating unified extensible firmware interface (UEFI) images using a verification database. Method 700 represents a method for detecting an image type of UEFI images in an IHS.

The description of methods 600 and 700 are provided with general reference to the specific components illustrated within the preceding FIGS. 1-5. Generally, methods 600 and 700 are described as being implemented via processor 102 and particularly the execution of code provided by verification F/W 326 acting within processor 102. It is however appreciated that certain aspects of the described methods may be implemented via BMC 144 or other processing devices and/or execution of other code.

Method 600 is performed during a DXE phase of IHS 100 or during a boot device selection phase of IHS 100. Method 600 is performed subsequent to the pre-EFI initialization phase. Referring to the flow chart of FIG. 6, method 600 begins at start block 602 and proceeds to block 604 where processor 102 receives a request to authenticate a UEFI image (e.g., UEFI image 522a). At block 606, processor 102 determines a type of the UEFI image. In one or more embodiments, processor 102 may determine the type of the UEFI image by determining a location of the UEFI image, as described in greater detail in FIG. 7. In another embodiment, processor 102 may determine the type of the UEFI image by reading metadata associated with the UEFI image. At block 608, processor 102 retrieves a certificate (e.g., Db certificate 508a) from a first entry (e.g., Db entry 342a) of a signature database. In one embodiment, the signature database is an authorization signature database (e.g., Db 336). In another embodiment, the signature database is a forbidden signatures database (e.g., Dbx 338).

At block 610, processor 102 determines whether the retrieved certificate was used to sign the UEFI image. In response to determining the retrieved certificate was not used to sign the UEFI image, processor 102 determines whether additional entries exist in the signature database (block 622). In response to determining additional entries exist in the signature database, processor 102 retrieves a certificate (e.g., Db certificate 508b) from a next entry (e.g., Db entry 342*b*) in the signature database (block 624). Method 600 then returns to block 610 where processor 102 determines whether the retrieved certificate was used to sign the image. In response to determining no additional entries exist in the signature database (at block 622), processor 102 issues a notification to at least one of an output device and an error log. The notification indicates that the image was not able to be authenticated (block 626). Method 600 then terminates at block 626.

In response to determining, at block 610, that the retrieved certificate was used to sign the image, processor 102 determines a verification entry (e.g. verification entry 346*a*) in a verification database that corresponds to the entry in the authorization database that contains the retrieved certificate (block 612). At block 614, processor 102 identifies, within the determined verification entry, a particular type of image that the retrieved certificate may be used to authenticate. In one embodiment, the particular type may indicate, for example, a boot image type or a device firmware type.

At block 616, processor 102 determines whether the type of the UEFI image matches the particular type of image that the retrieved certificate may be used to authenticate. In response to determining the type of the UEFI image does not match the particular type, method 600 proceeds to block 622 where processor 102 determines whether additional entries exist in the signature database. In response to determining the type of the UEFI image does match the particular type, method 600 proceeds to optional block 618, if the verification entry identifies a particular device. At block 618, processor 102 determines, whether a particular device that is associated with the UEFI image matches a particular device identified in the verification entry that the retrieved certificate may be used to authenticate. In response to determining the particular device identified in the verification entry does not match the device associated with the UEFI image, method 600 proceeds to block 622 where processor 102 determines whether additional entries exist in the signature database. It should be noted that if the verification entry does not specify a particular device, method 600 proceeds directly from block 616 to block 620 responsive to an affirmative determination at block 616. In response to determining the particular device identified in the verification entry matches the particular device associated with the UEFI image, processor 102 authenticates the UEFI image using the retrieved certificate (block 620). If the retrieved certificate was retrieved from Db 336, the authorization of the UEFI image permits the UEFI image to execute on IHS 100. If the retrieved certificate was retrieved from Dbx 338, the authorization of the UEFI image forbids the UEFI image from executing on IHS 100. Method 600 then terminates at block 626.

FIG. 7 illustrates a method for detecting or determining a type of a UEFI image in an IHS. Method 700 is performed during a DXE phase of IHS 100 or during a boot device selection phase of IHS 100. In one or more embodiments, method 700 may be performed at step 606 of method 600. Method 700 begins at start 702 and proceeds to block 704 where processor 102 determines a storage location of a UEFI image identified within a request for authentication. At block 706, processor 102 determines whether the storage location of the UEFI image is (1) located within a filesystem or (2) is accessed using a base address register. In response to determining the UEFI image is accessed using a base address register, processor 102 identifies the type of the image as a device firmware type (block 708) and method 700 terminates at block 714. In response to determining the UEFI image is located within a filesystem, processor 102 identifies the type of the image as a boot image type (block 708) and method 700 terminates at block 714. In one embodiment, the filesystem is located within a local storage (e.g., storage media 212) of IHS 100. In another embodiment, the filesystem may be located within an external storage device that is remotely accessible to IHS 100 via network 170 and method 700 terminates at block 714.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
receiving, by a baseboard management controller (BMC) of an information handling system, a request to authenticate an image from among a plurality of images;
determining a type of the image from among a plurality of types comprising a device firmware type and a boot image type, the determining comprising:
determining a storage location of the image; and
determining the type of the image based on the storage location;
retrieving, from an entry within a Unified Extensible Firmware Interface (UEFI) signature database, a certificate utilized to sign the image, the certificate being used to validate a single device and cannot be used to validate other similar devices, wherein each entry in the UEFI signature database contains a certificate used to sign at least one image from among the plurality of images;
determining, from within a verification database, a verification entry that corresponds to the entry of the UEFI signature database, wherein an associated UEFI comprises a plurality of different database components comprising a platform key (PK) database, a key exchange key (KEK) database, an authorization signature database (Db), a forbidden signature database (Dbx), and at least one verification database;
identifying, from the verification entry, a particular type of image which the certificate may be used to authenticate, wherein each verification entry in the verification database (1) is associated with a particular certificate in the UEFI signature database and (2) identifies, from among a plurality of image types, a type of image for which the particular certificate may be used to authenticate;
determining whether the type of the image is the particular type; and
in response to determining the type of the image is the particular type, authenticating the image using the certificate.

2. The method of claim 1, wherein the UEFI signature database is the authorization signature database, the method further comprising:
in response to authenticating the image using the certificate, permitting execution of the authorized image.

3. The method of claim 1, wherein the UEFI signature database is the forbidden signature database, the method further comprising:
in response to authenticating the image using the certificate, forbidding execution of the authorized image.

4. The method of claim 1, wherein retrieving the certificate further comprises:
sequentially checking each entry of a plurality of entries in the UEFI signature database until the entry having the certificate used to sign the image is identified.

5. The method of claim 4, further comprising:
in response to determining the type of the image is not the particular type, continuing the sequential checking the plurality of entries for a subsequent certificate that was used to sign the image; and
in response to identifying the subsequent certificate within the remaining entries, retrieving the subsequent certificate as the certificate.

6. The method of claim 5, further comprising:
in response to being unable to locate the subsequent certificate within the remaining entries:
generating a notification that indicates that the image was not able to be authenticated; and issuing the notification to at least one of an output device and an error log.

7. The method of claim 1, further comprising:
in response to determining the storage location is accessed using a device base address register, identifying the type of the image as a device firmware type.

8. The method of claim 1, further comprising:
in response to determining the storage location is a filesystem, identifying the type of the image as a boot image type.

9. The method of claim 1, further comprising executing a verification firmware during a driver execution phase (DXE) to facilitate verification of UEFI images, bootloaders, and/or drivers prior to loading/booting an corresponding component.

10. The method of claim 1, wherein:
the verification entry specifies both a device firmware type and a particular device that a corresponding certificate in the UEFI signature database may be used to authenticate; and
the authenticating the image using the certificate further comprises:
determining: (i) the particular device identified in the verification entry and (ii) whether the particular device matches a particular device that is associated with the UEFI image; and
in response to determining (i) the image type identified in the verification entry matches the identified image type of the UEFI image and (ii) the particular device identified in the verification entry matches the device associated with the UEFI image, authenticating the UEFI image using the certificate.

11. The method of claim 10, wherein:
the particular device is one of a network interface device, a storage controller, and a graphics device; and
the particular device is identified in the verification entry by a unique identifier from among unique identifies comprising a serial number, a PCIe vendor ID and PCIe device ID, and a media access control (MAC) address.

12. An information handling system comprising:
a Unified Extensible Firmware Interface (UEFI) signature database having a plurality of entries, each entry having a certificate used to sign at least one corresponding image from among a plurality of images;
a verification database having a plurality of verification entries corresponding to the plurality of entries in the UEFI signature database, wherein each verification entry in the verification database (1) is associated with a particular certificate in the UEFI signature database and (2) identifies, from among a plurality of image types, a type of image for which the particular certificate may be used to authenticate;
a boot loader that identifies an image from among the plurality of images for authentication; and
at least one processor that:
determines a type of the image from among a plurality of types comprising a device firmware type and a boot image type, wherein the at least one processor:
determines a storage location of the image; and
determines the type of the image based on the storage location;
retrieves, from an entry within the UEFI signature database, a certificate utilized to sign the image, the certificate being used to validate a single device and cannot be used to validate other similar devices;
determines, from within a verification database, a verification entry that corresponds to the entry of the UEFI signature database and identifies, from the verification entry, a particular type of image which the certificate may be used to authenticate, wherein an associated UEFI comprises a plurality of different database components comprising a platform key (PK) database, a key exchange key (KEK) database, an authorization signature database (Db), a forbidden signature database (Dbx), and at least one verification database;
determines whether the type of the image is the particular type; and
in response to determining the type of the image is the particular type, authenticates the image using the certificate.

13. The information handling system of claim 12, wherein the UEFI signature database is the authorization signature database, and wherein the processor:
in response to authenticating the image using the certificate, permits execution of the authorized image.

14. The information handling system of claim 12, wherein the UEFI signature database is the forbidden signature database, and wherein the processor:
in response to authenticating the image using the certificate, forbids execution of the authorized image.

15. The information handling system of claim 12, wherein in retrieving the certificate, the processor:
sequentially checks each entry of the plurality of entries in the UEFI signature database until the entry having the certificate used to sign the image is identified.

16. The information handling system of claim 15, wherein the processor:
in response to determining the type of the image is not the particular type, continues the sequential checking the plurality of entries for a subsequent certificate that was used to sign the image; and
in response to identifying the subsequent certificate within the remaining entries, retrieves the subsequent certificate as the certificate.

17. The information handling system of claim 16, wherein the processor in response to being unable to locate the subsequent certificate within the remaining entries:
generates a notification that indicates that the image was not able to be authenticated; and
issues the notification to at least one of an error log and an output device of the information handling system.

18. The information handling system of claim 12, wherein the processor:
in response to determining the storage location is accessed using a device base address register of the information handling system, identifies the type of the image as a device firmware type.

19. The information handling system of claim 12, wherein the processor:
in response to determining the storage location is a filesystem in a non-volatile storage that is accessible to the information handling system, identifies the type of the image as a boot image type.

20. The information handling system of claim 12, wherein:
the verification entry specifies both a device firmware type and a particular device that a corresponding certificate in the UEFI signature database may be used to authenticate; and
to authenticate the image using the certificate, the processor:

determines: (i) the particular device identified in the verification entry and (ii) whether the particular device matches a particular device that is associated with the UEFI image; and in response to determining (i) the image type identified in the verification entry matches the identified image type of the UEFI image and (ii) the particular device identified in the verification entry matches the device associated with the UEFI image, authenticates the UEFI image using the certificate.

\* \* \* \* \*